June 23, 1925. 1,543,578
P. C. LABASSE
ACCELERATOR
Filed Oct. 31, 1923
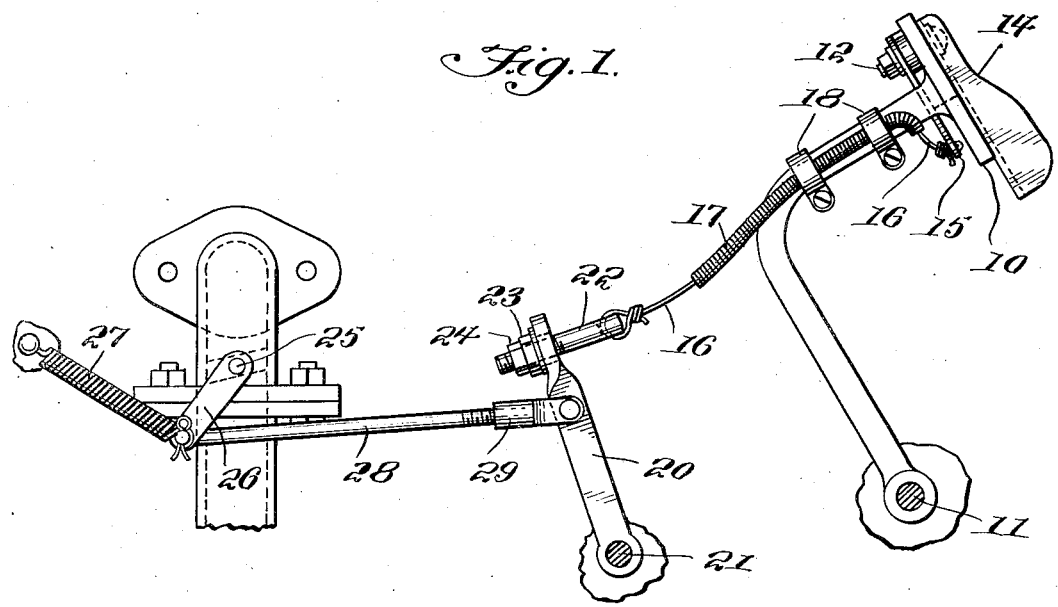
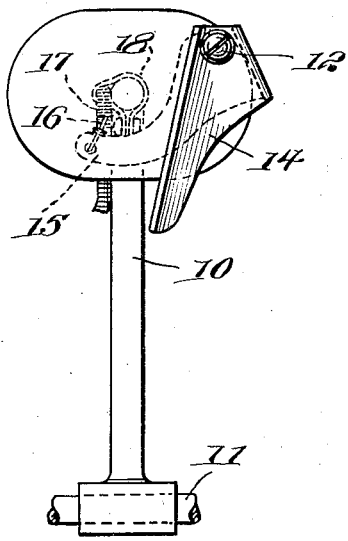
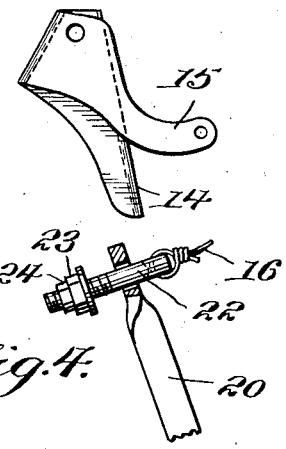
Paul C. Labasse
INVENTOR
BY Victor J. Evans
ATTORNEY
J. T. L. Wright
WITNESS:

Patented June 23, 1925.

1,543,578

UNITED STATES PATENT OFFICE.

PAUL C. LABASSE, OF NEW ORLEANS, LOUISIANA.

ACCELERATOR.

Application filed October 31, 1923. Serial No. 671,981.

*To all whom it may concern:*

Be it known that I, PAUL C. LABASSE, a citizen of the United States of America, residing at New Orleans, in the parish of Orleans and State of Louisiana, have invented new and useful Improvements in Accelerators, of which the following is a specification.

The object of this invention is to provide an attachment for the service brake pedal or clutch pedal of a motor car or the like, which will permit the driver to accelerate the engine without removing his foot from the pedal.

A further object is to provide for the automatic closing of the throttle valve when pressure is applied to the brake pedal, and without the necessity of the driver changing the position of his foot.

A still further object is to provide an attachment of the type indicated, which may be applied without important modification to any type of motor vehicle.

A still further object is to provide a device constituting a safety appliance, by reason of the fact that the interval usually required to permit of shifting from the accelerator to the brake is eliminated, this interval frequently being of great importance in avoiding accidents.

With the foregoing and other objects in view, the invention consists in the novel construction and arrangement of elements described illustrated and claimed, it being understood that modifications may be made within the scope of the claims without departing from the spirit of the invention.

In the drawings, Figure 1 is a view in side elevation, showing at the right a service brake pedal and at the left a throttle valve, and the special control of the latter by arm 14 on the pedal; Figure 2 shows the pedal and arm 14 in top plan; Figure 3 is a detail view of arm 14 with its lower extension 15 (the device being inverted); Figure 4 is a detail of the connection permitting lost motion at the upper end of arm 20 of Figure 1.

The element 10 may be regarded as a service brake pedal or clutch pedal of a motor vehicle. The pedal is mounted at 11, and has secured thereto, (for pivotal movement) by a bolt 12, a device 14 constituting a quadrant, foot lever or arm, designed to control the throttle valve in accelerating the engine. This device 14 is thrown to position for opening the valve by sidewise pressure of the foot, while the latter is still on the pedal but without applying pressure to the latter.

Formed with operating or accelerating device 14 and extending below the top of the pedal is a leg 15 connected with a wire 16 passing through a tubular element 17 retained by securing devices 18 in the manner shown. The construction just described may however be varied to suit the conditions existing in different makes of cars.

Lever 20 is pivoted at 21, and a bar 22 passes loosely through an opening in its upper end, the bar having connection with wire 16, and the extreme end of the bar being threaded and carrying nuts 23, 24. These nuts, or the one adjacent to element 20 bears on the face of the latter except when pressure is applied to the pedal.

Throttle valve 25 is operated by a lever 26 rigid with the axial element of the valve, and a spring 27 connected with the end of the lever exerts tension thereon and holds the valve closed when no other force is applied.

Connecting rod 28 is secured to the end of the lever, and the other end of the rod is threaded into a tubular portion of element 29 pivotally connected with lever 20.

As a result of this construction, the accelerator is operable while the foot remains lightly above the brake pedal and in contact therewith, but when pressure is applied to the pedal, bar 22 moves idly through the opening in the upper end of lever 20, the movement being toward the left in the drawing, and bar 28 is free to move to the left under tension of spring 27. This causes lever 26 to move to position for closing valve 25 automatically and instantaneously, incident to the application of the brake. The closing movement of the valve takes place during the initial movement of the pedal and before the brake is applied. When the pedal is released, the nut on rod 22 adjacent to arm 20 will engage the latter, and the throttle valve will open to the same extent as before, if the position of the foot with reference to element 14 is not changed.

What I claim is:

1. In a device of the class described, a pedal, an arm connected with the pedal and movable by the foot of an operator, without operating the pedal or removing the foot from the latter, said arm extending above and below the pedal and around an edge thereof, a pivot passing through the upper and lower portion of the arm and through the pedal, a pivoted lever, means connected with the arm for moving the lever in one direction, a rod movable with the lever, a valve and valve lever controlled by the rod, and a spring connected with the valve lever for holding the valve normally closed.

2. In a device of the class described, a pedal, an arm pivotally connected with the pedal and movable laterally independently of the pedal, a pivoted lever, the pedal and lever being movable about parallel axes, a device passing loosely through the lever and connected with the arm, a member connected with this device and at times engaging the lever for moving the latter in one direction upon movement of the arm, a rod movable with the lever, a throttle valve and valve lever, the rod being connected with the valve lever, and a spring connected with the valve lever and moving the latter when pressure is applied to the pedal and the member engaging the first named lever is moved out of engagement therewith.

In testimony whereof I affix my signature.

PAUL C. LABASSE.